UNITED STATES PATENT OFFICE.

GRANT HAMMOND, OF SAN FRANCISCO, CALIFORNIA, ASSIGNOR OF ONE-THIRD TO CLEVELAND L. DAM, OF SAN FRANCISCO, CALIFORNIA, AND ONE-THIRD TO MILTON B. MILLER, OF SUNOLGLEN, CALIFORNIA.

ARTIFICIAL STONE.

No. 860,744.     Specification of Letters Patent.     Patented July 23, 1907.

Application filed July 27, 1905. Serial No. 271,459.

*To all whom it may concern:*

Be it known that I, GRANT HAMMOND, a citizen of the United States, residing at the city and county of San Francisco and State of California, have invented new and useful Improvements in Artificial Stone, of which the following is a specification.

My invention relates to artificial stone or like material and its manufacture.

It consists in the combination of materials which will be more fully explained in the following specification:

I employ a mineral magnesite, which is first calcined and powdered, hydrochloric acid is then added to the mass forming a magnesium chlorid; this is then diluted with water, (for this purpose either fresh or salt water, such as sea water may be employed) I then add a small percentage of sulfuric acid, I then take beach sand, crushed rock, saw-dust, or other suitable material and mix it with dry calcined magnesite. After being thoroughly mixed I pour the diluted solution on the dry mixture until it is made of any desired consistency sufficient to be poured or otherwise placed in molds where it is allowed to set or dry. I have found that the proportions of the parts thus used may be very considerably varied: Thus after hydrochloric acid has been added to the powdered calcined material, the water may be added in the proportion varying from one to five parts, with relation to the mass; the percentage of sulfuric acid may vary from one-twentieth ($\frac{1}{20}$) to one-eighth ($\frac{1}{8}$) of the hydrochloric acid previously used; the proportion of sand or other material may vary from one to ten parts with relation to the magnesia with which it is to be mixed. If the acid solution is not quite neutralized, and is hot, it will set in a few minutes. If neutralized or cold, it will take a longer time to set, which may be as much as two or three days. This material serves to form tiling, billiard-table beds, molding, decorative articles, tombstones, etc. If the molds have a smooth or polished surface, the surfaces in contact with the molds will present the same appearance.

By taking the material before the sand is added, it is sufficiently plastic to be used as a fire-proof paint, or it may form a plaster or other hard coating by being properly laid on. I am able to form a particularly valuable building or like brick or block by mixing the calcined magnesite with sea water and sand, in the proportions of one of sand, from one-fifth ($\frac{1}{5}$) to one-half ($\frac{1}{2}$) of the magnesite, and sufficient sea water to moisten so that it may be easily molded. I have found that saw-dust or equivalent substances may be used in conjunction with the magnesite, either separately or mixed with the sand or crushed rock to form a particularly light building block.

It is well known that when magnesium chlorid is added to calcined magnesite in the proper proportion a basic or oxy-chlorid of magnesium is formed. Since magnesium chlorid is a most hygroscopic salt, that is has such a tendency to collect moisture from the air, it is not to be wondered at that the oxy-chlorid would grow moist or gather a bloom on its surface. The addition of sulfuric acid lessens this tendency. When the sulfuric acid is added to my compound I have every reason to believe that oxy-, or basic sulfates of magnesium are formed. Magnesium sulfate is not at all hygroscopic, in fact the hydrated salt is efflorescent. The addition of the sulfuric acid is thus a departure from the formula employing only the magnesium chlorid and magnesite calcined.

Having thus described my invention, what I claim and desire, to secure by Letters Patent is—

1. A composition of matter consisting of powdered calcined magnesite mixed with dilute hydrochloric acid and sulfuric acid and afterwards molded and allowed to set.

2. Building and like blocks composed of calcined magnesite mixed with sea water and sand, dilute hydrochloric acid, and a small percentage of sulfuric acid, said mixture being afterwards hardened in a mold.

3. As an article of manufacture, blocks formed by a mixture of dry calcined magnesite first mixed with dilute hydrochloric acid having a small percentage of sulfuric acid subsequently added, and pulverized material mixed with said mass to a consistency which will set and harden in a mold.

In testimony whereof I have hereunto set my hand in presence of two subscribing witnesses.

GRANT HAMMOND.

Witnesses:
A. K. DAGGETT,
S. H. NOURSE.